United States Patent
Ando

(10) Patent No.: US 6,876,470 B2
(45) Date of Patent: Apr. 5, 2005

(54) SCANNER UNIT HAVING FIRST AND SECOND INHIBITING ELEMENTS FOR INHIBITING MOVEMENT OF A FRAME

(75) Inventor: Kouichi Ando, Kamakura (JP)

(73) Assignees: Kabushiki Kaisha Toshiba, Tokyo (JP); Toshiba TEC Kabushiki Kaisha, Tokyo (JP)

( * ) Notice: Subject to any disclaimer, the term of this patent is extended or adjusted under 35 U.S.C. 154(b) by 735 days.

(21) Appl. No.: 09/773,530

(22) Filed: Feb. 2, 2001

(65) Prior Publication Data

US 2003/0025946 A1 Feb. 6, 2003

(51) Int. Cl.⁷ .................................................. H04N 1/04
(52) U.S. Cl. ..................................... 358/474; 358/488
(58) Field of Search .............................. 358/400, 474, 358/497, 505, 500

(56) References Cited

U.S. PATENT DOCUMENTS 3,983,810 A * 10/1976 Brugge et al. .............. 101/269
4,835,872 A * 6/1989 Alcantara et al. ........... 33/18.1
4,982,236 A * 1/1991 Bock .......................... 399/211

FOREIGN PATENT DOCUMENTS

| JP | 7-234455 | 9/1995 |
| JP | 2977225 | 9/1999 |

* cited by examiner

Primary Examiner—Edward Coles
Assistant Examiner—Heather D. Gibbs
(74) Attorney, Agent, or Firm—Foley & Lardner LLP

(57) ABSTRACT

A scanner unit has first and second carriages located below a glass document table. The first carriage has a first frame extending from a front side to a rear side along the document table, i.e. in a main scanning direction. The scanner unit contains, at the front side and the rear side, two rails that support the opposite ends of the first frame such that the first frame can slide in a sub-scanning direction. The scanner unit also contains, at the front side and the rear side, inhibiting elements for receiving a part of the first frame when the first carriage has slid along the rail to a hold position, thereby inhibiting the movement of the first carriage in the main scanning direction, and also for holding another part of the frame together with the rail when the carriage has slid to the hold position, thereby inhibiting the vertically upward movement of the frame.

24 Claims, 5 Drawing Sheets under both us patents and the

SCANNER UNIT HAVING FIRST AND SECOND INHIBITING ELEMENTS FOR INHIBITING MOVEMENT OF A FRAME

BACKGROUND OF THE INVENTION

The present invention relates to a scanner unit installed in, for example, a copy machine.

In general, a copy machine is provided with a scanner unit for scanning an image of a document to be copied. The scanner unit has a substantially horizontal glass document table for mounting a document thereon.

Below the document glass table, first and second carriages are provided, which extend along the glass document table from the front-side of the machine to the rear-side, i.e. in a main scanning direction. The first carriage includes a first frame provided with a lamp for illuminating a document placed on the glass document table, a reflector for reflecting the light of the lamp onto the surface of the document, and a first mirror for changing the direction of the light reflected from the document by 90°. The second carriage includes a second frame provided with a second mirror for changing the direction of the light reflected from the first mirror by 90°, and a third mirror for changing the direction of the light reflected from the second mirror by 90°. Light reflected from the third mirror is guided to a light receiving element via a condenser.

The casing of the scanner unit contains, at its front and rear sides, two rails that support the front-side and rear-side ends of the first frame of the first carriage so that the frame can slide, and two rails that support the front-side and rear-side ends of the second frame of the second carriage so that the frame can slide. Further, the front-side end of the first carriage is connected to the front-side end of the second carriage by means of a wire tensioned therebetween via a plurality of pulleys, while the rear-side end of the first carriage is connected to the rear-side end of the second carriage by means of a wire tensioned therebetween via a plurality of pulleys. When running the wires, the first carriage slides along corresponding rails at a predetermined speed in a sub-scanning direction, and the second carriage is driven by the first carriage to slide at half the speed of the first carriage along corresponding rails in the sub-scanning direction.

When packing and shipping the copy machine equipped with the scanner unit, it is necessary to fix the frames of the first and second carriages to the casing of the scanner unit, since the first and second carriages are mounted on the rails in an unstable manner. If the first and second carriages are not fixed, each carriage may touch a peripheral component, thereby deforming its frame or damaging an optical member such as a lamp or a mirror.

In light of the above, the copy machine is shipped in a state as shown in FIG. 7, in which the second frame 144 of the second carriage is screwed to a casing wall 132L of the scanner unit, and the front-side and rear-side ends of the first frame 143 of the first carriage are screwed to casing walls 132f and 132r.

When, for example, screwing the rear-side end 143r of the first frame 143 of the first carriage to the casing wall 132r as shown in FIG. 8, the rear-side end 143r of the first frame 143 is screwed to a plate section 201 projecting from the casing wall 132r. In this case, a screw 203 is inserted through a hole 202 formed in the plate section 201, and a front end portion 205 of the screw 203 is inserted into a hole 204 formed in a end portion 143r of the first frame. At this time, a threaded portion 206 provided at the proximal end side of the screw 203 is screwed with the hole 202 of the plate section 201, thereby fixing the first frame 143 to the casing 132.

However, when screwing the opposite ends of the first frame to the casing as described above, a delicate job of inserting the screw 205, through the very small hole 202 of the plate section 201, into the much smaller hole 204 of the first frame is required. Since it is difficult to detect the hole 204 itself and hence to insert the screw 203 into the two holes 202 and 204, a lot of time and effort is necessary for fixing the first frame.

BRIEF SUMMARY OF THE INVENTION

The present invention has been developed in light of the above, and aims to provide a scanner unit, which includes carriages that can be fixed easily using a small number of components for fixing the carriages when shipping a copy machine, thereby reducing the manufacturing cost and working cost required for the fixing operation of the carriages.

To satisfy the aim, the present invention provides a scanner unit comprising: a carriage provided with a frame extending in a first direction along a document surface of a document set substantially horizontal, and an optical member mounted on the frame for illuminating the document surface and guiding light reflected from the document surface to light receiving means; a rail extending along the document surface in a second direction perpendicular to the first direction, and mounting thereon the frame such that the frame can slide in the second direction; a first inhibiting element for receiving a part of the frame when the carriage has slid along the rail to a hold position, thereby inhibiting a movement of the frame in the first direction; and a second inhibiting element for holding another part of the frame together with the rail when the carriage has slid to the hold position, thereby inhibiting a vertically upward movement of the frame.

Further, the scanner unit of the present invention comprises a first carriage provided with a first frame extending in a first direction along a document surface of a document set substantially horizontal, and an optical member mounted on the first frame for illuminating the document surface and guiding light reflected from the document surface; a second carriage provided with a second frame extending in the first direction along a document surface of a document set substantially horizontal, and an optical member mounted on the second frame for guiding, to light receiving means, light guided from the document surface via the optical member mounted on the first frame; a first rail extending along the document surface in a second direction perpendicular to the first direction, and mounting thereon the first frame such that the first frame can slide in the second direction; a second rail extending in the second direction and supporting the second frame such that the second frame can slide in the second direction; a fixing member that fixes the second frame to one end of the second rail; a coupling member coupling the first and second frames such that the first frame can be driven by the second frame, or vice versa, the first carriage being driven by the second carriage and slid to a hold position when the second frame is fixed in a predetermined position by the fixing member; a first inhibiting element for receiving a part of the first frame when the first carriage has slid along the first rail to the hold position, thereby inhibiting a movement of the first frame in the first direction; and a second inhibiting element for holding another part of the first frame together with the first rail when the first carriage has slid to the hold position, thereby inhibiting a vertically upward movement of the first frame.

DETAILED DESCRIPTION OF THE INVENTION

The embodiment of the invention will be described in detail with reference to the accompanying drawings.

Figure 1:
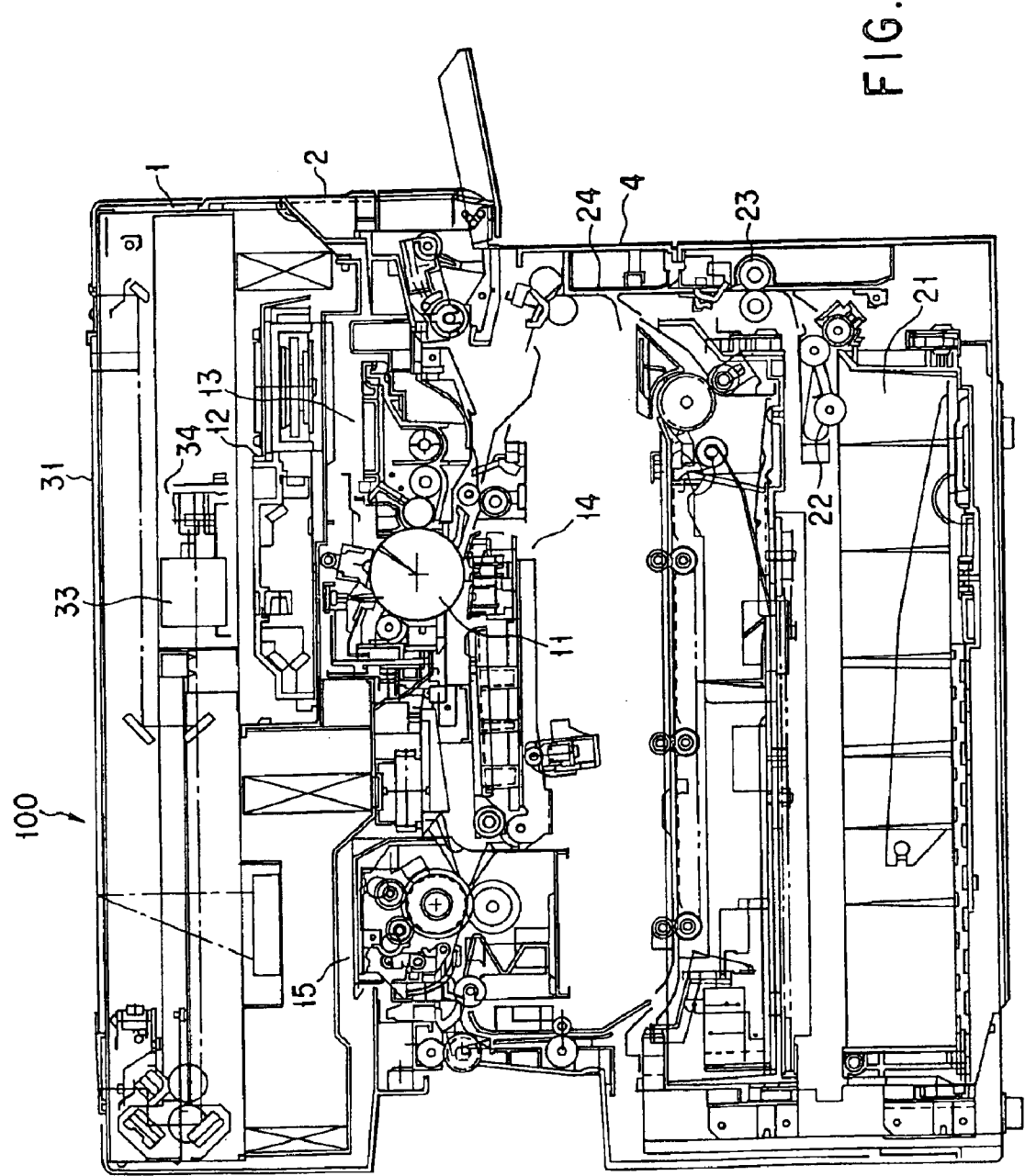
FIG. 1 is a schematic view illustrating a copy machine with a scanner unit according to the embodiment of the invention.

FIG. 1 shows a rough structure of a copy machine 100 equipped with a scanner unit 1 according to the embodiment of the invention.

The copy machine 100 comprises a scanner unit 1 for scanning an image of a document, an image forming section 2 for outputting a scanned image on a sheet of paper, and a paper feed section 4 for feeding a sheet of paper to the image forming section 2.

The image forming section 2 includes an exposure unit 12 for emitting and scanning a laser beam, which is based on image data read from a document by the scanner unit 1, onto the outer periphery of a photosensitive drum 11, thereby exposing the periphery, a developing unit 13 for supplying a developer onto the outer periphery of the photosensitive drum 11, thereby developing an electrostatic latent image thereon, a transfer unit 14 for transferring a developer image formed on the outer periphery of the photosensitive drum 11, onto a sheet of paper fed from the paper feed section 4, and a fixing unit 15 for heating and pressurizing the paper sheet with the developer image, thereby fixing the developer image thereon.

The paper feed section 4 includes a sheet cassette 21 for containing a plurality of paper sheets, a pickup roller 22 provided at a right-side end portion of the sheet cassette 21 in the figure, and a sheet conveyance path 24 having pairs of conveyance rollers 23 for conveying each paper sheet, fed from the sheet cassette 21 in accordance with the rotation of the pickup roller 22, to a transfer area between the outer periphery of the photosensitive drum 11 and the transfer unit 14.

When copying an image of a document onto a paper sheet, a paper sheet is picked up from the sheet cassette 21 and guided to the sheet conveyance path 24 by the rotation of the pickup roller 22, and supplied to the transfer area using the pairs of conveyance rollers 23. At this time, a known image forming process is executed in the image forming section 2, whereby a developer image formed on the outer periphery of the photosensitive drum 11 is conveyed to the transfer area in accordance with the rotation of the photosensitive drum 11. The developer image thus conveyed to the transfer area is transferred onto the paper sheet by the transfer unit 14, and then heated and pressurized against the paper sheet by the fixing unit 15, thereby being fixed thereon.

Figure 2:
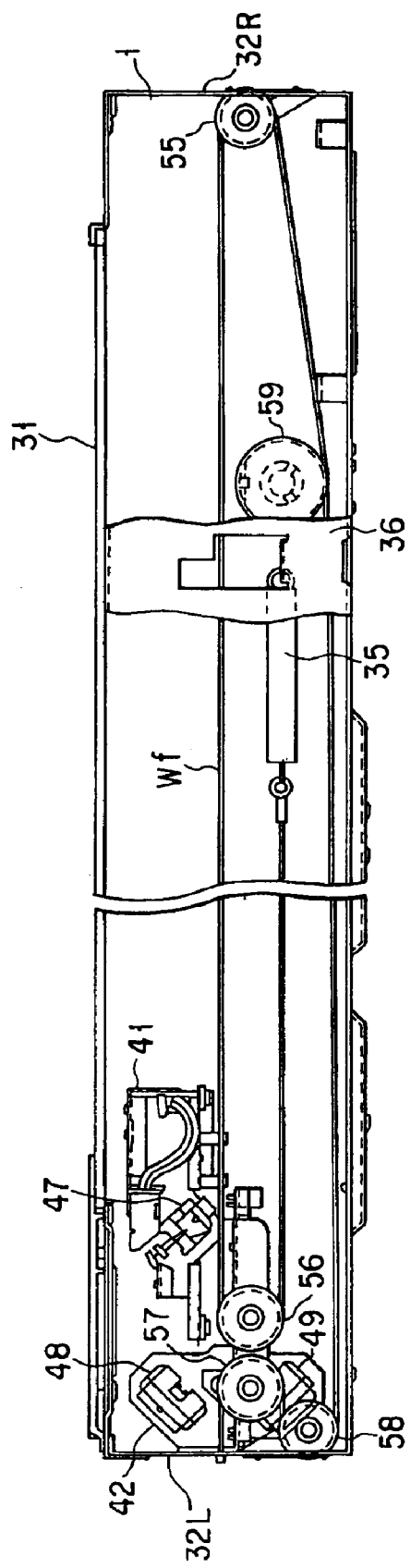
FIG. 2 is a view illustrating the scanner unit viewed from the front side of the machine.
Figures 3, 4:
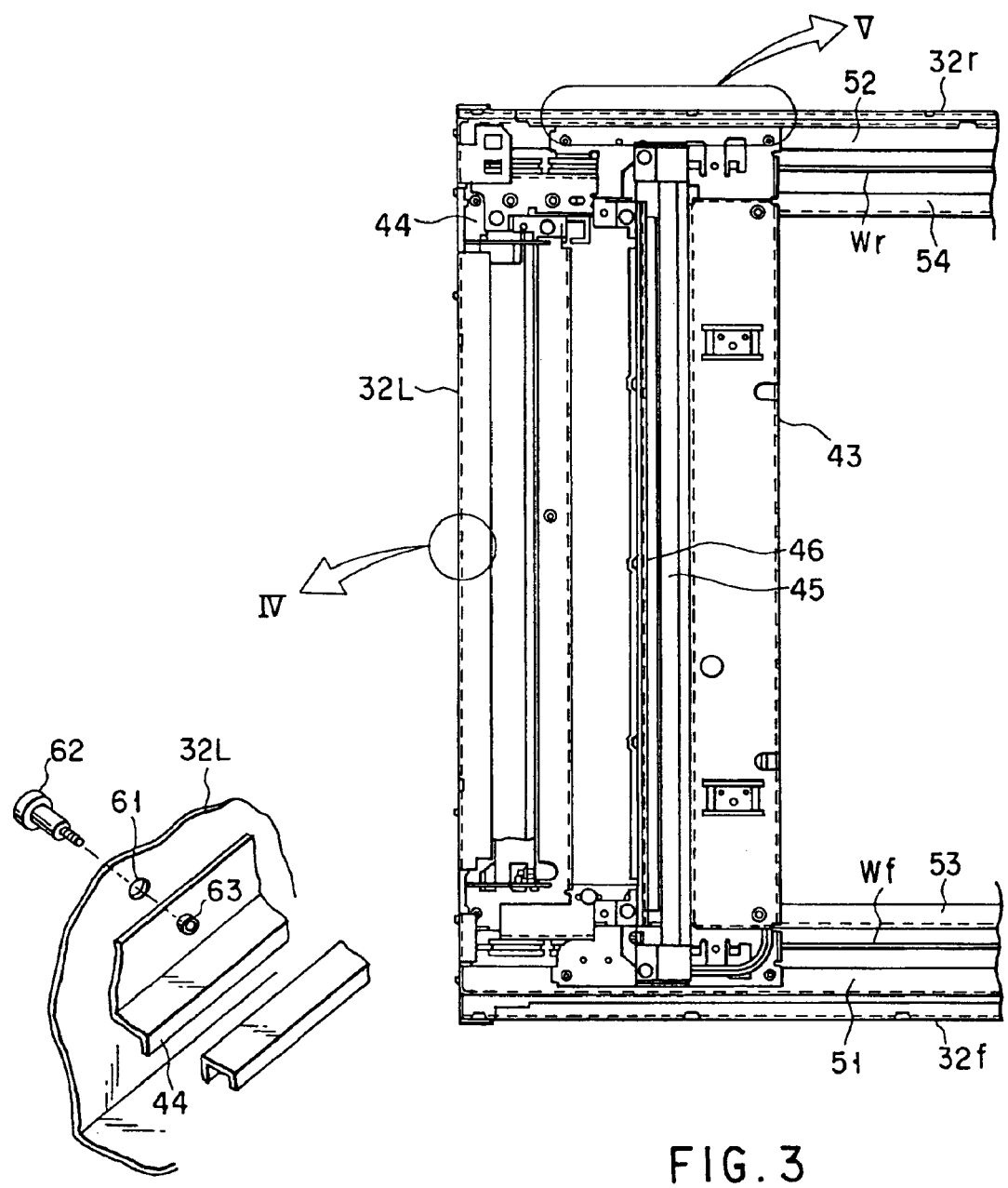
FIG. 3 is a plan view illustrating an essential part of the scanner unit.
FIG. 4 is a perspective view illustrating a fixing mechanism for fixing a second carriage to the casing of the scanner unit.

Referring now to FIGS. 2 and 3, the scanner unit 1 will be described. FIG. 2 is a view illustrating the scanner unit 1 viewed from the front side of the copy machine 100. FIG. 3 is a plan view illustrating a left-side end portion of the scanner unit 1 viewed from just above.

The scanner unit 1 includes a substantially horizontal glass document table 31 for placing a document thereon, and a substantially rectangular casing 32 having an upper surface thereof constituted of the glass document table 31. In the description below, the front-side wall of the casing 32 will be referred to as "front wall 32f", the rear-side wall as "rear wall 32r", a left-side wall in FIG. 2 as "left wall 32L", and a right-side wall as "right wall 32R".

In the casing 32 below the glass document table 31, there are provided first and second carriages 41 and 42, which extend along the glass document table 31 from the front side to the rear side, i.e. in a main scanning direction (first direction). The first and second carriages 41 and 42 respectively have first and second frames 43 and 44 extending in the main scanning direction.

The first frame 43 is provided with a lamp 45 for illuminating, through the glass document table 31, the lower surface of a document, i.e. a document surface, placed on the glass document table 31, a reflector 46 for converging the light of the lamp 45 onto the document surface, and a first mirror 47 for changing, to the left in FIG. 2 by 90°, the direction of the light reflected from the document surface. The second frame 44 is provided with a second mirror 48 for vertically downwardly changing, by 90°, the direction of the light reflected from the first mirror 47, and a third mirror 49 for changing, to the right in FIG. 2 by 90°, the direction of the light reflected from the second mirror 48.

The light reflected to the right in FIG. 2 by the third mirror 49 is guided to a CCD sensor 34 via a condenser 33 located in a predetermined position in the casing 32 (see FIG. 1). The CCD sensor 34 subjects the reflected light to photoelectric conversion, thereby preparing image data necessary for the image forming process executed by the image forming section 2.

Inside the front and rear walls 32f and 32r of the casing 32, there are provided four rails, each pair of rails 51 and 53 and rails 52 and 54 extending parallel at different heights along the glass document table 31 in a sub-scanning direction (second direction) perpendicular to the main scanning direction. The first frame 43 has its front-side end mounted on the front-side upper rail 51, and its rear-side end mounted on the rear-side upper rail 52, whereby the first carriage 41 is supported such that it can slide in the sub-scanning direction. The second frame 44 has its front-side end mounted on the front-side lower rail 53, and its rear-side end mounted on the rear-side lower rail 54, whereby the second carriage 42 is supported such that it can slide in the sub-scanning direction.

The first frame 43 of the first carriage 41 is connected to the second frame 44 of the second carriage 42 by means of two wires Wf and Wr (connection members) of the same length. In other words, the front-side ends of the frames 43 and 44 are connected by the wire Wf, while their rear-side ends are connected by the wire Wr.

As shown in FIG. 2 (this figure shows only the wire Wf), the front-side wire Wf is wound on a pulley 55 fixed to the right wall 32R of the casing 32, two pulleys 56 and 57 fixed to the front-side end of the second frame 44, a pulley 58 fixed to the left wall 32L of the casing 32, and a driving pulley 59, and tensioned therebetween. Further, the wire Wf has its one end fixed to the left wall 32L of the casing, and the other end fixed to a frame 36 via a spring 35. The front-side end of the first frame 43 is secured to a middle portion of the wire Wf. The other wire Wr provided at the rear-side of the machine is tensioned in the same manner and has the same function as the front-side wire Wf.

When the front-side and rear-side pulleys 59 are rotated by a motor (not shown) at a predetermined rotational speed in a predetermined direction, the wires Wf and Wr run at a predetermined speed. As a result, the first carriage 41 slides at the same speed as the wires along the rails 51 and 52 in the sub-scanning direction, while the second carriage 42 slides at half the speed along the rails 53 and 54 in accordance with the sliding operation of the first carriage 41.

The first and second carriages 41 and 42 start a sliding operation at their respective start positions slightly deviated rightward from the shown positions, thereby scanning a document from its front end to its rear end. In other words, the first and second carriages 41 and 42 are fixed in the shown positions deviated leftward from their respective start positions when the copy machine 100 is packed for shipment. In this state, the second frame 44 of the second carriage 42 is fixed to the left wall 32L, and the first carriage 41 follows the second carriage 42 and is held in the shown hold position.

The thus fixing of the first and second carriages at positions closest to the left wall 32L of the casing prevents the first and second frames 43 and 44 from falling into an unstable jumpy state on the rails 51–54 because of, for example, vibration that occurs when shipping the machine. As a result, a plurality of optical members installed in each frame 43 or 44 are prevented from touching a peripheral component and being damaged. Further, the frames 43 and 44 themselves are prevented from touching a peripheral component and involving a problem, for example, being deformed.

Figure 5:
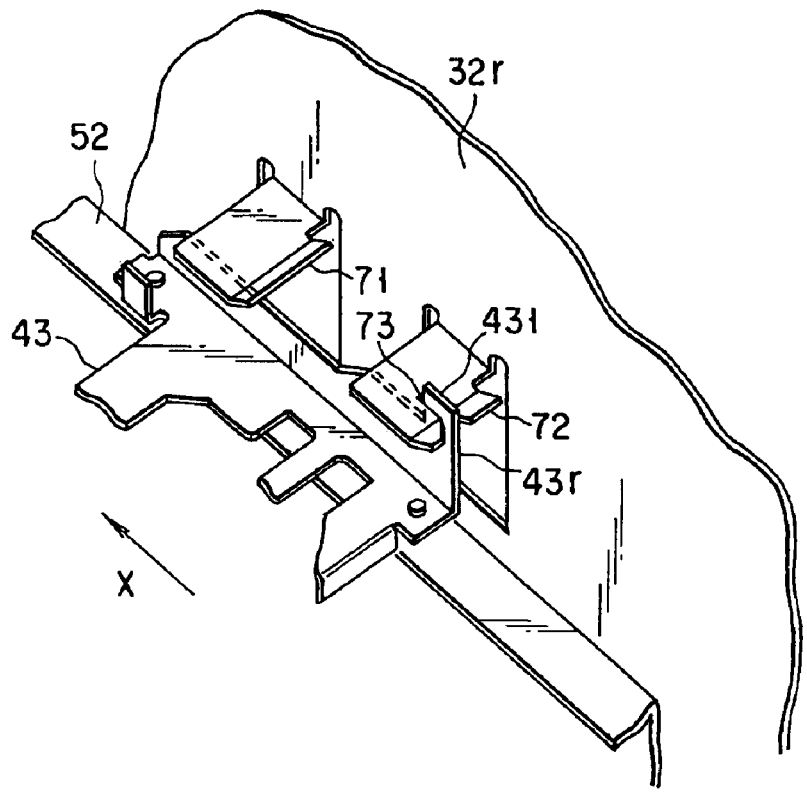
FIG. 5 is a perspective view showing a holding mechanism for holding a first carriage in a predetermined hold position.
Figure 6A:
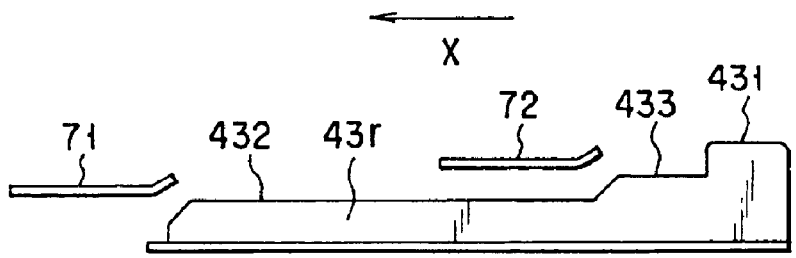
FIG. 6A is a view illustrating a state of the first carriage released from the holding mechanism.
Figure 6B:
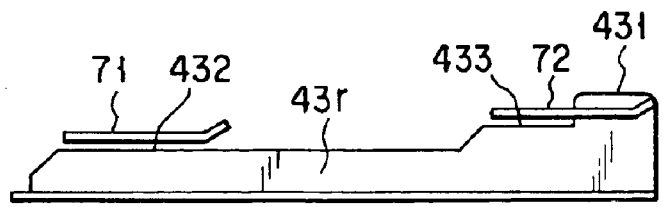
FIG. 6B is a view illustrating a state of the first-carriage held by the holding mechanism.
Figures 7, 8:
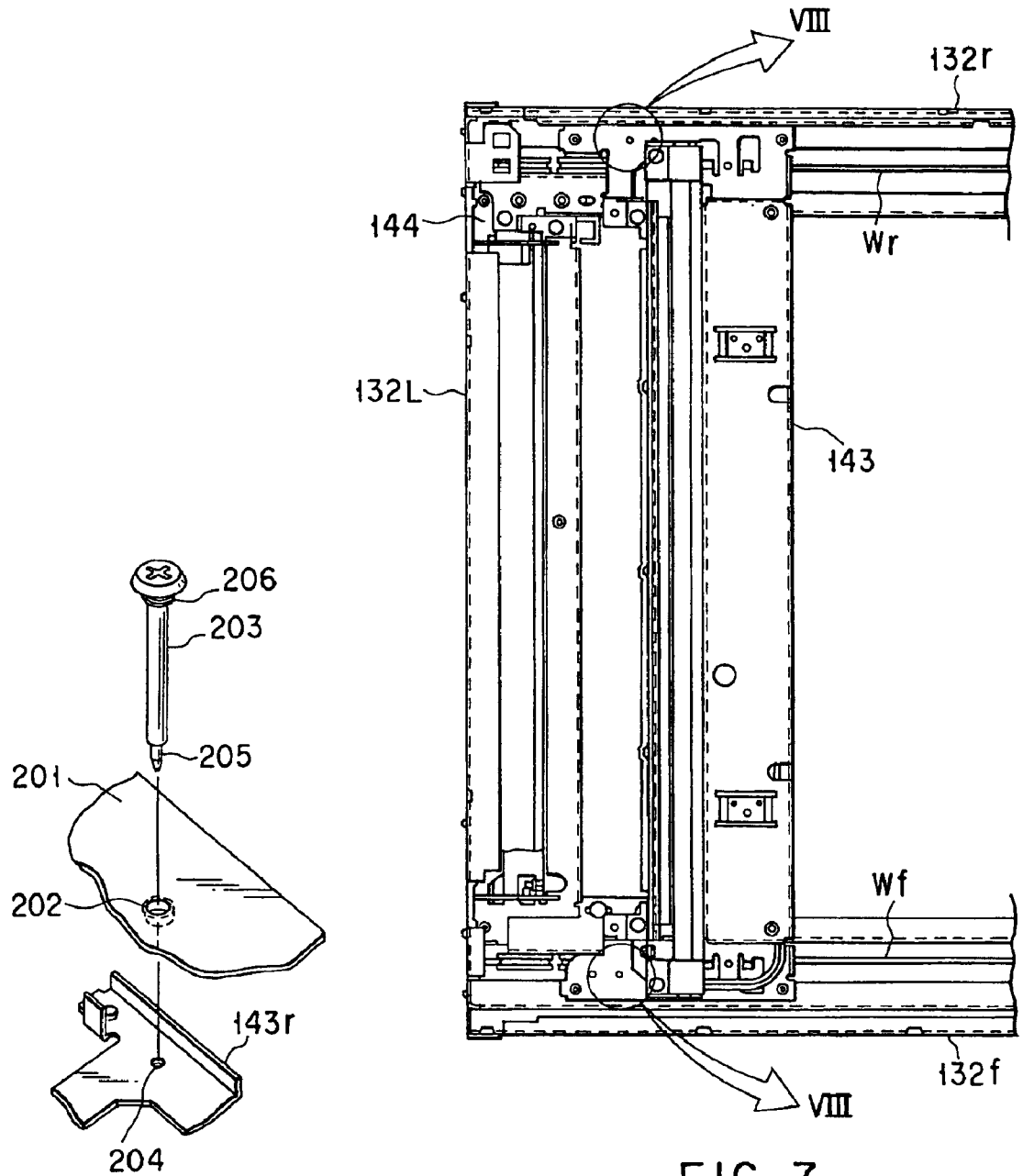
FIG. 7 is a plan view useful in explaining a method for fixing a carriage in a conventional scanner unit.
FIG. 8 is a perspective view illustrating a conventional fixing mechanism for fixing a first carriage to a scanner unit.

Referring then to FIGS. 4, 5, 6A, and 6B, a description will be given of a method for fixing the first and second frames 43 and 44. FIG. 4 shows a fixing mechanism for fixing a portion of the second frame 44 to the left wall 32L of the casing 32. FIG. 5 only shows a holding mechanism for holding the rear-side end of the first frame 43 at the rear wall 32r of the casing 32. Although a similar holding mechanism is provided at the front-side of the casing 32, only the rear-side mechanism will be described. FIGS. 6A and 6B are views useful in explaining the holding operation of the holding mechanism of FIG. 5.

When fixing the second frame 44 to the left wall 32L of the casing 32, a screw 62 (fixing member) is inserted from the outside of the casing 32 through a through hole 61 formed in a predetermined portion of the left wall 32L of the casing 32, thereby screwing the front end of the screw 62 into a screw hole 63 formed in a corresponding portion of the second frame 44, as is shown in FIG. 4. The screw hole 63 in the second frame 44 has a smaller diameter than the through hole 61 in the left wall 32L, and a front end portion of the screw 62, having a smaller diameter, is screwed in the screw hole 63. The holes 61 and 63 are formed in substantially central portions of the scanner unit 1 in the main scanning direction (see FIG. 3).

Thus, when fixing the second frame 44 to the casing 32 by the screw 62, the second frame 44 is situated in a position deviated from its scanning start position and closer to the left wall 32L, i.e. the frame 44 is substantially in contact with the left wall 32L. In this state, the first frame 43 connected to the second frame 44 by means of two wires Wf and Wr is situated in a predetermined hold position (shown in FIG. 6B) deviated leftward.

As shown in FIG. 5, the rear-side end of the first frame 43 mounted on the rail 52 has an angled portion 43r formed by bending a portion of the frame substantially vertically upward. Further, two projections 71 and 72 (second inhibiting elements) in the form of substantially rectangular plate chips, which hold the angled portion 43r of the first frame 43 together with the rail 52, are provided on the rear wall 32r of the casing 32, projecting above the rail 52 inside the casing 32. The two projections 71 and 72 extend at different heights along the rail 52 in the sub-scanning direction, separate from each other. The upstream-side projection 72 has a slit 73 (first inhibiting element) formed therein in the sub-scanning direction, more specifically, in a direction indicated by arrow X in the figure (in a direction in which the first frame 43 is shifted to its hold position), for receiving a part of the angled portion 43r.

The first frame 43 is usually situated in a position shown in FIG. 6A, in which the angled portion 43r does not interrupt the projection 71 or 72. During a usual operation, the first frame 43 is shifted rightward from the position shown in FIG. 6A. In other words, the locations and sizes of the two projections 71 and 72 are determined so that they do not interrupt the angled portion 43r when the first frame 43 is deviated from the hold position shown in FIG. 6B. The thus positioning of the two projections 71 and 72 prevents them from touching the first frame 43 during a usual copying operation and causing undesirable vibration, thereby adversely affecting a copied image output to a paper sheet.

When packing the copy machine 100 for shipment, the second frame 44 is situated close to the left wall 32L and fixed to the casing 32, while the first frame 43 is held in its hold position, as described above. When the second frame 44 is fixed, the first frame follows the second frame 44 and is automatically slid from the start position of FIG. 6A to the hold position of FIG. 6B.

As a result of the movement of the first frame 43 along the direction indicated by arrow X, a projection 431 included in the angled portion 43r is inserted in the slit 73 of the projection 72. Furthermore, as a result of the movement of the first frame 43, the other portions 432 and 433 of the angled portion 43r are inserted between the projection 71 and the rail 52 and between the projection 72 and the rail 52, respectively.

In this state (shown in FIG. 6B), the clearance between the projection 431 of the angled portion 43r and the slit 73 of the projection 72 is very small, and hence the slit 73 inhibits the movement of the first frame 43 in the main scanning direction. Also in this state, the clearance between the upper surface of another portion 432 of the angled portion 43r and the lower surface of the projection 71, and that between the upper surface of another portion 433 and the lower surface of the projection 72 are very small. Accordingly, the projections 71 and 72 inhibit the vertically upward movement of the first frame 43 mounted on the rail 52.

As described above, in the present invention, the first frame 43 of the first carriage 41 is automatically held in a predetermined hold position when fixing the second frame 44 of the second carriage 42 to the casing 32 of the scanner unit 1. At this time, neither of the two screws used in the prior art for fixing the main-scanning-directional opposite ends of the first frame to the casing is required. As a result, the number of components necessary for fixing the first and second carriages can be decreased, and therefore the manufacturing cost of the unit can be reduced. Moreover, since it is not necessary to screw the opposite ends of the first frame to the casing, the first and second carriages can be fixed more easily, thereby reducing the cost required for the fixing operation.

The invention is not limited to the above-described embodiment, but may be modified in various ways without departing from its scope. For example, in the above embodiment, when the first frame 43 is slid to its hold position, the projection 431 of the angled portion 43r is inserted in the slit 73, and the other portions 432 and 433 are inserted between the projection 71 and the rail 52 and between the projection 72 and the rail 52, respectively, thereby inhibiting the main-scanning-directional movement and the vertically upward movement of the first frame 43. This structure may be modified such that a spring structure for holding the projection 431 in the main scanning direction is imparted to the slit 73, and also a spring structure for pressing the other portions 432 and 433 against the rail 52 to hold them is imparted to the projections 71 and 72, thereby preventing the opposite ends of the first frame 43 from moving both vertically and in the main scanning direction completely.

What is claimed is:

1. A scanner unit comprising:
   a carriage provided with a frame extending in a first direction along a document surface of a document set substantially horizontal, and an optical member mounted on the frame for illuminating the document surface and guiding light reflected from the document surface to light receiving means;
   a rail extending along the document surface in a second direction perpendicular to the first direction, and mounting thereon the frame such that the frame can slide in the second direction;
   a first inhibiting element having a slit which receives a part of the frame when the carriage has slid along the rail to a hold position, said first inhibiting element inhibiting a movement of the frame when the carriage has slid to the hold position in the first and second directions; and
   a second inhibiting element for holding another part of the frame together with the rail when the carriage has slid to the hold position, thereby inhibiting a vertically upward movement of the frame.

2. The scanner unit according to claim 1, wherein the second inhibiting element includes a plurality of inhibiting elements arranged in the second direction.

3. The scanner unit according to claim 2, wherein the second inhibiting elements are provided along opposite sides of the frame, which extend in the first direction.

4. The scanner unit according to claim 2, wherein the first inhibiting element is provided in one of the second inhibiting elements, which is located at a most upstream side in the direction in which the carriage slides toward the hold position.

5. The scanner unit according to claim 1, wherein the first and second inhibiting elements are located in positions in which the first and second inhibiting elements do not interrupt the frame when the frame is situated in a position other than the hold position.

6. The scanner unit according to claim 1, wherein the first inhibiting element has a spring structure for preventing the part of the frame from moving in the first direction, and the second inhibiting element has a spring structure for pressing said another part of the frame against the rail to hold the frame.

7. A scanner unit comprising:
   a first carriage provided with a first frame extending in a first direction along a document surface of a document set substantially horizontal, and an optical member mounted on the first frame for illuminating the document surface and guiding light reflected from the document surface;
   a second carriage provided with a second frame extending in the first direction along a document surface of a document set substantially horizontal, and an optical member mounted on the second frame for guiding, to light receiving means, light guided from the document surface via the optical member mounted on the first frame;
   a first rail extending along the document surface in a second direction perpendicular to the first direction, and mounting thereon the first frame such that the first frame can slide in the second direction;
   a second rail extending in the second direction and supporting the second frame such that the second frame can slide in the second direction;
   a fixing member that fixes the second frame at one end side of the second rail;
   a coupling member coupling the first and second frames such that the first frame can be driven by the second frame, or vice versa, the first carriage being driven by the second carriage and slid to a hold position when the second frame is fixed in a predetermined position by the fixing member;
   a first inhibiting element having a slit which receives a part of the first frame when the first carriage has slid along the first rail to the hold position, said first inhibiting element inhibiting a movement of the first frame when the first carriage has slid to the hold position in the first and second directions; and
   a second inhibiting element for holding another part of the first frame together with the first rail when the first carriage has slid to the hold position, thereby inhibiting a vertically upward movement of the first frame.

8. The scanner unit according to claim 7, wherein the second inhibiting element includes a plurality of inhibiting elements arranged in the second direction.

9. The scanner unit according to claim 8, wherein the second inhibiting elements are provided along these opposite side of the first frame, which extend in the first direction.

10. The scanner unit according to claim 8, wherein the first inhibiting element is provided in that one of the second inhibiting elements, which is located at a most upstream side in the direction in which the first carriage slides toward the hold position.

11. The scanner unit according to claim 7, wherein the first and second inhibiting elements are located in positions in which the first and second inhibiting elements do not interrupt the first frame when the first frame is released from a fixed state by the fixing member and slides along the first rail to a position other than the hold position.

12. The scanner unit according to claim 7, wherein the first inhibiting element has a spring structure for preventing the part of the first frame from moving in the first direction, and the second inhibiting element has a spring structure for pressing said another part of the first frame against the first rail to hold the frame.

13. A scanner unit comprising:
- a carriage provided with a frame extending in a first direction along a document surface of a document set substantially horizontal, and an optical member mounted on the frame to illuminate the document surface and guide light reflected from the document surface to a light receiving element;
- a rail extending along the document surface in a second direction perpendicular to the first direction, and mounting thereon the frame such that the frame can slide in the second direction;
- a first inhibiting element having a slit which receives a part of the frame when the carriage has slid along the rail to a hold a position, said first inhibiting element inhibiting a movement of the frame when the carriage has slid to the hold position in the first and second directions; and
- a second inhibiting element which holds another part of the frame together with the rail when the carriage has slid to the hold position to inhibit a vertically upward movement of the frame.

14. The scanner unit according to claim 13, wherein the second inhibiting element includes a plurality of inhibiting elements arranged in the second direction.

15. The scanner unit according to claim 14, wherein the second inhibiting elements are provided along opposite sides of the frame, which extend in the first direction.

16. The scanner unit according to claim 14, wherein the first inhibiting element is provided in one of the second inhibiting elements, which is located at a most upstream side in the direction in which the carriage slides toward the hold position.

17. The scanner unit according to claim 13, wherein the first and second inhibiting elements are located in positions in which the first and second inhibiting elements do not interrupt the frame when the frame is situated in a position other than the hold position.

18. The scanner unit according to claim 13, wherein the first inhibiting element has a spring structure which prevents the part of the frame from moving in the first direction, and the second inhibiting element has a spring structure which presses said another part of the frame against the rail to hold the frame.

19. A scanner unit comprising:
- a first carriage provided with a first frame extending in a first direction along a document surface of a document set substantially horizontal, and an optical member mounted on the first frame which illuminates the document surface and guides light reflected from the document surface;
- a second carriage provided with a second frame extending in the first direction along the document surface of the document set substantially horizontal, and an optical member rounded on the second frame which guides, to a light receiving element, light guided from the document surface via the optical member mounted on the first frame;
- a first rail extending along the document surface in a second direction perpendicular to the first direction, and mounting thereon the first frame such that the first frame can slide in the second direction;
- a second rail extending in the second direction and supporting the second frame such that the second frame can slide in the second direction;
- a fixing member that fixes the second frame at one end side of the second rail;
- a coupling member coupling the first and second frames such that the first frame can be driven by the second frame, or vice versa, the first carriage being driven by the second carriage and slid to a hold position when the second frame is fixed in a predetermined position by the fixing member;
- a first inhibiting element having a slit which receives a part of the first frame when the first carriage has slid along the first rail to the hold position, said first inhibiting element inhibiting a movement of the first frame when the first carriage has slid to the hold position in the first and second directions; and
- a second inhibiting element which holds another part of the first frame together with the first rail when the first carriage has slid to the hold position to inhibit a vertically upward movement of the first frame.

20. The scanner unit according to claim 19, wherein the second inhibiting element includes a plurality of inhibiting elements arranged in the second direction.

21. The scanner unit according to claim 20, wherein the second inhibiting elements are provided along opposite sides of the first frame, which extend in the first direction.

22. The scanner unit according to claim 20, wherein the first inhibiting element is provided in that one of the second inhibiting elements, which is located at a most upstream side in the direction in which the first carriage slides toward the hold position.

23. The scanner unit according to claim 19, wherein the first and second inhibiting elements are located in positions in which the first and second inhibiting elements do not interrupt the first frame when the first frame is released from a fixed state by the fixing member and slides along the first rail to a position other than the hold position.

24. The scanner unit according to claim 19, wherein the first inhibiting element has a spring structure which prevents the part of the first frame from moving in the first direction, and the second inhibiting element has a spring structure which presses said another part of the first frame against the first rail to hold the frame.

* * * * *